United States Patent [19]

Decker et al.

[11] Patent Number: 5,347,120

[45] Date of Patent: Sep. 13, 1994

[54] METHOD AND APPARATUS FOR PULSED-LASER DETECTION

[75] Inventors: Lawrence G. Decker, Loveland, Ohio; Janet R. Poston, Alexandria, Ky.; Edward F. Hume, Cincinnati, Ohio

[73] Assignee: Cincinnati Microwave, Inc., Cincinnati, Ohio

[21] Appl. No.: 53,468

[22] Filed: Apr. 27, 1993

Related U.S. Application Data

[63] Continuation of Ser. No. 890,555, May 28, 1992, Pat. No. 5,206,500.

[51] Int. Cl.$^5$ ............................................. H01J 40/14
[52] U.S. Cl. ............................. 250/214 B; 250/214 R
[58] Field of Search ............... 250/221, 222.1, 214 B, 250/214 R, 561; 356/5; 340/555–557, 942, 961, 902–905

[56] References Cited

U.S. PATENT DOCUMENTS

| | | |
|---|---|---|
| 4,249,160 | 2/1981 | Chilvers ............................. 340/33 |
| 4,277,170 | 7/1981 | Miles ................................. 356/152 |
| 4,349,823 | 9/1982 | Tagami et al. ................... 340/904 |
| 4,383,238 | 5/1983 | Endo ................................. 340/32 |
| 4,447,800 | 5/1984 | Kasuya et al. ................... 340/940 |
| 4,477,184 | 10/1984 | Endo ................................. 356/141 |
| 4,527,158 | 7/1985 | Runnels ............................ 340/961 |
| 4,631,542 | 12/1986 | Grimsley .......................... 342/20 |
| 4,742,312 | 2/1988 | Snaper ............................. 250/214 B |
| 4,755,818 | 7/1988 | Conrad ............................. 340/961 |
| 5,001,777 | 3/1991 | Liautaud .......................... 455/227 |
| 5,008,532 | 4/1991 | Ono et al. ........................ 250/222.1 |
| 5,010,341 | 4/1991 | Huntley et al. .................. 342/20 |
| 5,057,683 | 10/1991 | Fukuyama ....................... 250/314 B |
| 5,083,129 | 1/1992 | Valentine et al. ................ 342/20 |
| 5,151,591 | 9/1992 | Johnson et al. ................. 250/214 B |
| 5,172,113 | 12/1992 | Hamer ............................. 340/902 |

*Primary Examiner*—David C. Nelms
*Attorney, Agent, or Firm*—Limbach & Limbach

[57] ABSTRACT

A method and apparatus for determining the strength and proximity of a pulsed-laser radar signal is provided. A photodetector detects signals and provides the signals to a decision network. The decision network evaluates the signals and generates an output pulse when a detected signal is a valid signal according to predetermined criteria implemented in the decision network. A processor is coupled to the decision network for counting output pulses. A threat indicator is driven by the processor in proportion to the output pulse count.

10 Claims, 6 Drawing Sheets

STAGE 1

STAGE 2

STAGE 3

METHOD AND APPARATUS FOR PULSED-LASER DETECTION

This is a continuation of application Ser. No. 07/890,555, filed May 28, 1992 now U.S. Pat. No. 5,206,500.

FIELD OF THE INVENTION

The present invention relates to optical detection systems, and more particularly, to a system for detecting the presence of a laser based optical signal.

BACKGROUND

Systems for detecting the presence of a radar signal, for example, a signal emitted by a police radar gun toward a traveling car, are generally known. Thus, for example, U.S. Pat. No. 5,010,341 discloses a passive radar detector that includes a comparator, a pulse stretcher, and a ripple counter. An alarm signal is generated when the number of pulses counted exceeds a predetermined value. U.S. Pat. No. 5,083,129 discloses a radar detector that includes front and rear antennae. The signal strength from the antennae is compared to determine direction of origin of the radar signal. U.S. Pat. No. 5,001,777 discloses a radar detector that includes front and rear receivers connected to a single control head. A signal strength indicator varies proportionally to the intensity and frequency of the signal.

As radar guns have evolved, so have radar detectors. Thus, current state of the art radar guns emit pulsed laser signals in the infrared frequency range. Such guns have created a new set of signal processing problems related to higher frequency signals, and there is presently no adequate solution for detecting and indicating the presence of a laser-based signal. In this regard, applicant is aware of U.S. patent application Ser. No. 407,568, filed Sep. 15, 1989, although applicant does not admit that this application or the invention described therein is prior art relative to the present invention. The claims of this application recite a hand-held laser detector that converts the optical laser pulse to a first electrical signal, then passes the first signal through a threshold gate only if the first signal exceeds a predefined signal strength. A second signal is generated if the pulse width of the first signal is less than a predefined pulse width value, and this condition is indicated by an indicator means. A delay circuit prevents the second signal from being cancelled if a laser pulse having a pulse width greater than the predefined pulse width value is received shortly after the second signal has been generated.

U.S. Pat. No. 4,277,170 discloses an aircraft collision avoidance system that includes a laser detector. The detector includes a discriminator circuit, including a threshold network and a delay network, for passing only those signals which have time behavior similar to the anticipated laser signal.

Thus, it would be desirable to have a system that reliably and accurately detects the presence of a pulsed-laser signal and provides and indication of the same, including an indication of the relative threat of the signal.

SUMMARY OF THE INVENTION

A laser detection system is presented. A photodetector receives an optical signal and converts it an electrical signal. A decision network evaluates the electrical signal to determine whether it represents a valid laser signal.

Pulse stretching means are employed to receive the electrical signal and convert it into a first signal. The first signal is characterized by having an increased pulse width relative to the electrical signal.

Noise averaging means are used to receive the electrical signal and convert it into a second signal. The second signal is representative of the average noise component of the electrical signal.

Envelope generating means are used for generating a threshold reference. The threshold reference is a linear function of the difference in magnitude between the first signal and the second signal.

First comparator means are used for comparing the magnitude first signal and the threshold reference signal. The first comparator means generates a first logic output which is true if the magnitude of the first signal is greater than the magnitude of the threshold reference signal. Second comparator means are used for comparing the electrical signal and the threshold reference signal. The second comparator means generates a second logic output which is true if the pulse width of the electrical signal measured as a function of time is greater than the response time of the second comparator.

Logic means are used for generating an alert indication if the first logic output is true and the second logic output is false.

In the preferred embodiment, first receiving means are provided to receive the first logic output and second receiving means are provided to receive the second logic output. First sensing means are provided to sense the logic stage of the first logic output, i.e., true or false, and second sensing means are provided to sense the logic state of the second logic output.

Storage means are provided for reading, storing, and writing data such as said first and second logic outputs and a plurality of other constant and variable data values. The storage means include a plurality of data stores.

Processing means are provided to interact with the storage means and the first and second sensing means. A clock counter is provided having a current value TC. Means are provided for initializing a first data store and second data store to contain a first preselected constant value $PRT_{MAX}$ and a second preselected constant value TOL, respectively. Means are provided for resetting a third data store PRT, a fourth data store T(1), a fifth data store T(0), and a sixth data store T such that each of these data stores contain the value 0 and for resetting a seventh data store C to contain the integer value 1. First update means are provided for updating the values of the fourth, fifth, and sixth data stores whereby T(1) is set equal to TC, T is set equal to T(1)−T(0), and T(0) is set equal to T(1), in sequence. Second update means are provided for updating the value of the third data store whereby PRT is set equal to T. First comparator means are provided for comparing T to $PRT_{MAX}$. Second comparator means are provided for comparing T to PRT+/−TOL. Evaluation means are providing for evaluating the value of C. Counter increment means are provided for incrementing the value of C.

When the storage means reads the first receiving means, the first update means is engaged. If the first logic output is false, then the first comparator means is engaged. If the first logic output is true, then the storage means reads the second receiving means and the evaluation means is engaged.

If the first comparator means is engaged, then if $T=PRT_{MAX}$ the reset means is engaged, but if $T \neq PRT_{MAX}$, then the first update means is engaged.

If the evaluation means is engaged and if C=2 then the second update means is engaged and the first update means is engaged, in sequence, but if C≠2 then the second comparator means is engaged.

If the second comparator means is engaged and if if T=PRT+/−TOL then the indicator means is engaged and the counter means is engaged, but if T≠PRT +/−TOL then the evaluation means is engaged.

If T≠PRT+/−TOL and if C=1 then the first update means is engaged, but if C≠1 then the counter is incremented and the first update means is engaged.

Another aspect of the invention provides a method and apparatus for determining the strength and proximity of a pulsed-laser radar signal. The decision network evaluates detected signals and generates an output pulse when a detected signal is a valid signal according to the predetermined criteria implemented in the decision network. A microprocessor is coupled to the decision network for counting output pulses. The microprocessor includes a look up table that provides a statistical correlation between the number of consecutive output pulses and the strength and proximity of the laser source. A threat indicator is driven in proportion to the output pulse count.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIGS. 2b-2d are circuit diagrams of portions of the laser detector illustrated in FIG. 2a.

DETAILED DESCRIPTION OF THE INVENTION

A typical laser radar gun of the type sought to be detected in the present invention generates a train of optical pulses having a frequency of 8 milliseconds and pulse width of 15 nanoseconds. In one known laser radar gun design, 60 pulses are emitted in a single pulse train for each gun burst. In another known laser radar gun design, the pulse train is continuously generated so long as the trigger is pressed. The present invention detects the presence of an optical signal as described above by discriminating for pulse width. Those signals having a pulse width of less than approximately 300 nanoseconds are considered "valid pulses." If valid pulses are received, then the invention makes a statistical determination of the proximity and strength, i.e., the "relative threat" of the optical signal, by counting the number of consecutive valid pulses detected and received.

Figure 1:
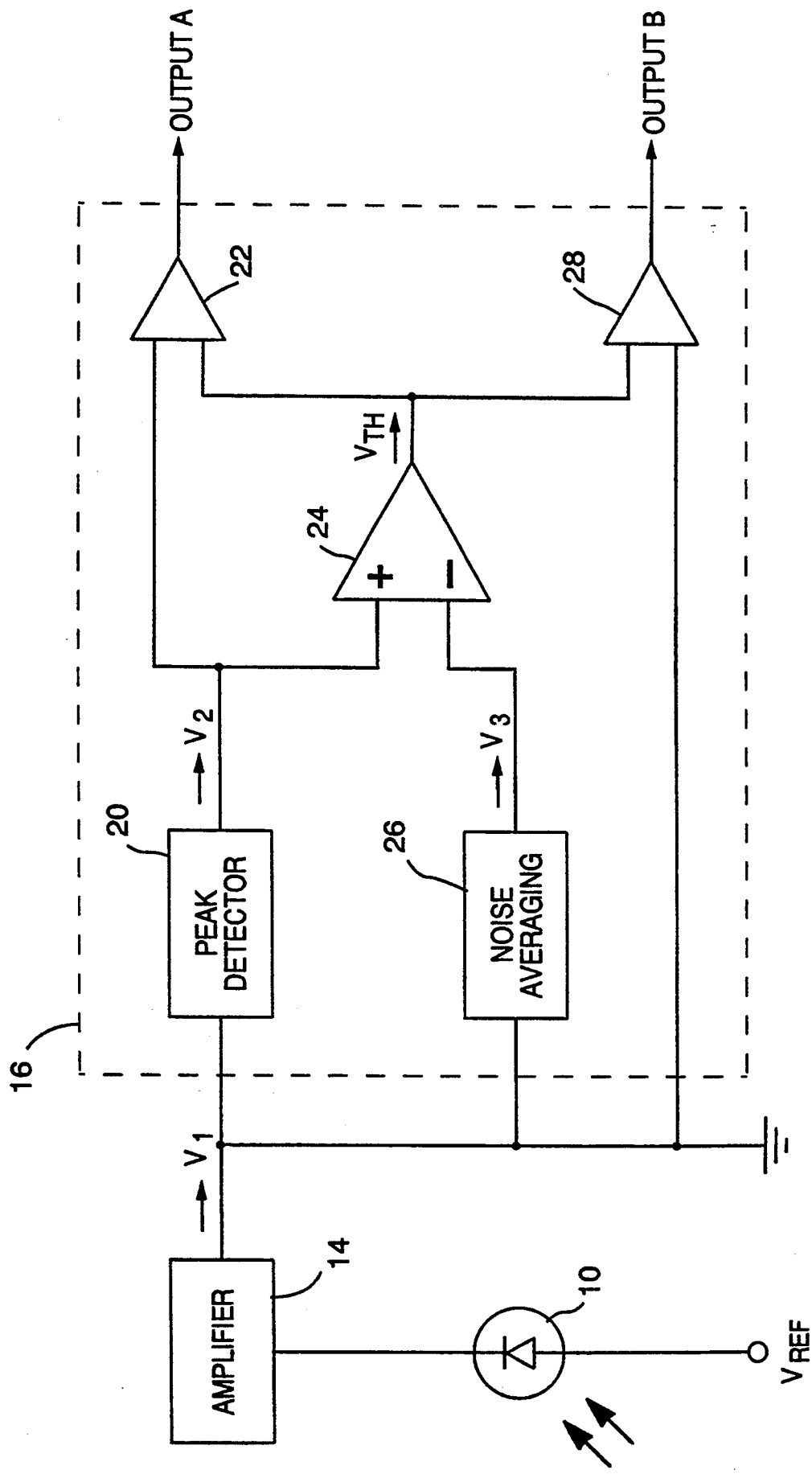
FIG. 1 is a block diagram of a laser detector according to the present invention.

Referring now to FIG. 1, the present invention is illustrated in block form. A light detector/converter 10 detects the presence of an optical signal and converts the optical signal into a digital electrical signal. The digital signal is boosted by amplifier 14 to produce a signal V1 which is processed and evaluated by decision network 16. The decision network 16 takes the signal V1 and applies it to a peak detector circuit 20 where signal V1 is stretched by RC circuitry into a signal V2 that is characterized by an increased pulse width relative to signal V1. Signal V2 is applied to one input of a first comparator 22 and to one input (+) of a differential amplifier 24. Signal V1 is also applied to a noise averaging circuit 26 and to one input of a second comparator 28. The output signal V3 of the noise averaging circuit 26 is applied to the other input (−) of the differential amplifier 24. The other inputs of the first comparator 22 and the second comparator 28 are provided by the threshold reference Vth which is the output of differential amplifier 24. The threshold reference Vth is characteristic of the differential amplifier 24 and is designed to be linear function of the noise envelope (i.e. V2−V3).

When signal V2, i.e., the peak of a stretched pulse, exceeds the threshold voltage Vth, output A of the first comparator 22 goes high. If the pulse width of signal V1 exceeds the response time of the second comparator 28, then output B of the second comparator 28 goes high as well. If, however, output B goes high within a set time period after output A goes high, then the pulse is rejected as invalid. Thus, a valid pulse exists if output A is high and output B is low.

Preferably, the outputs A and B are connected to a microprocessor 18, where data processing can be performed. For example, the microprocessor 18 is used to generate audible and visual indications of various conditions, as will be described later.

The preferred embodiment of the present invention will now be described with reference to FIGS. 2a-2d. A photodetector 110 is connected to a voltage reference Vr and to an amplifier 114. The photodetector 110 can generally be any type of device that converts photons to electrons, but for this application the preferred characteristics include low junction capacitance, large surface area, broad spectral response, and high responsivity, such as exhibited by the Hammamatsu model S2506 photodiode.

The amplifier 114 is a broadband, high gain, low input impedance amplifier preferably realized in three stages 114a, 114b, 114c. The first stage 114a is selected to provide high gain and low noise in order to provide a sufficient noise figure for the entire receiver. The first stage 114a is preferably constructed using a common emitter configured amplifier 115a, such as the Mitsubishi 2SC3606, to set the noise figure of the amplifier chain. A common base configured amplifier 115b, such as the Motorola MBT5088, is connected in cascode with amplifier 115a to flatten the bandpass. Amplifiers 115a and 115b are cascaded with a common collector configured amplifier 115c, such as the Motorola MBT5088, which provides a low output impedance used to drive the second stage 114b and to provide shunt-series feedback to the amplifier 115a, thus lowering the input impedance and widening the bandwidth of this stage.

Figure 2A:
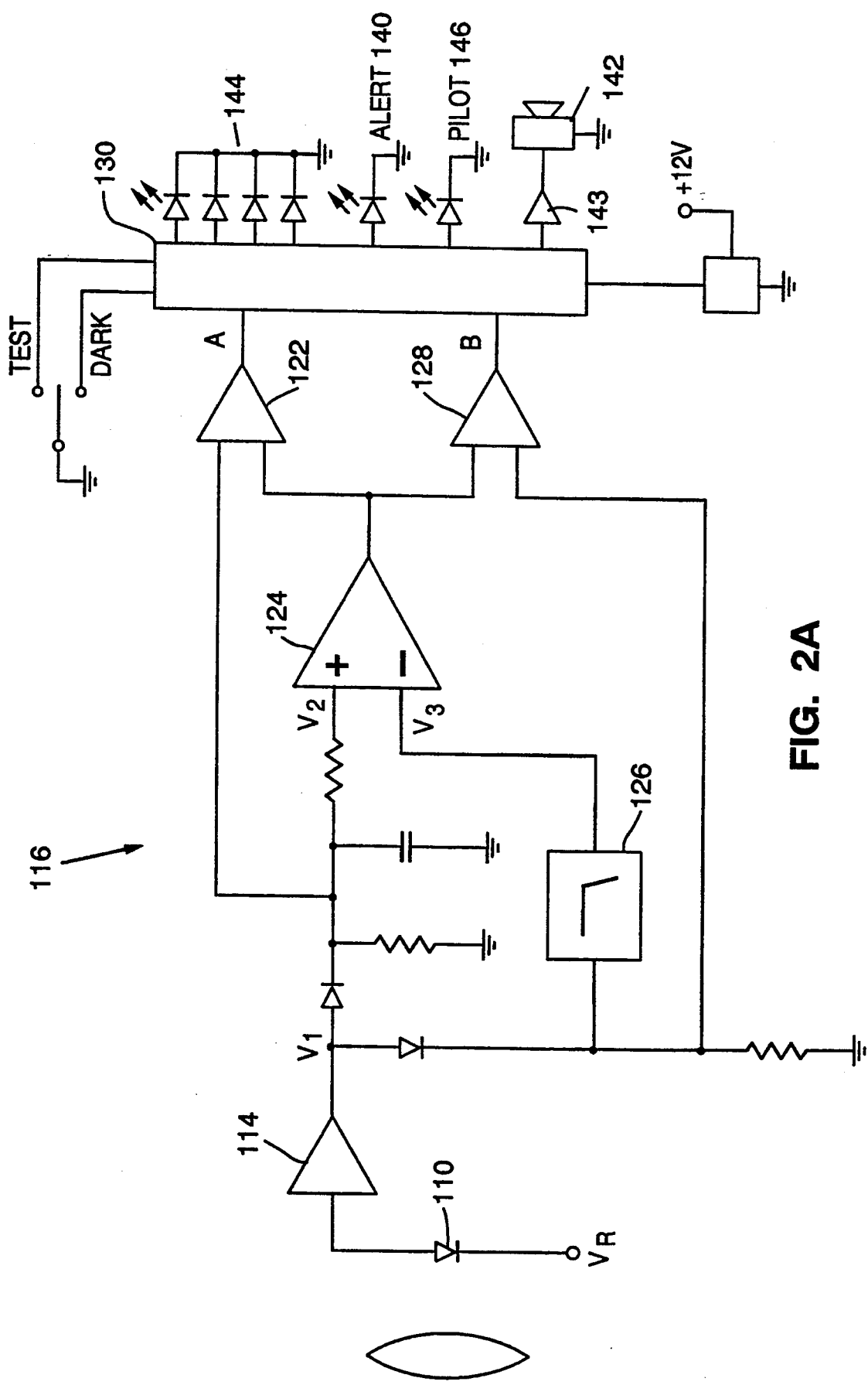
FIG. 2a is a schematic block diagram of the preferred embodiment of a laser detector according to the present invention.
Figure 2B:
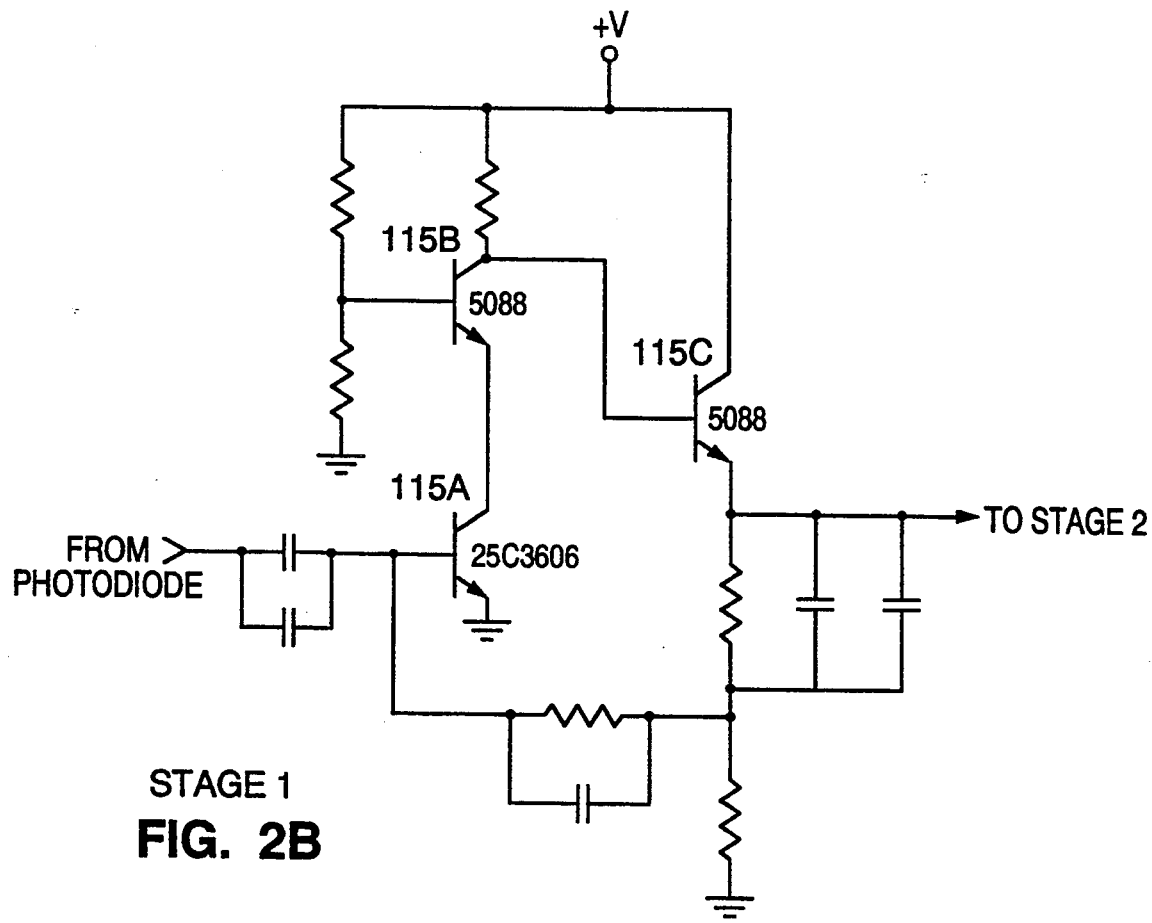
Figure 2C:
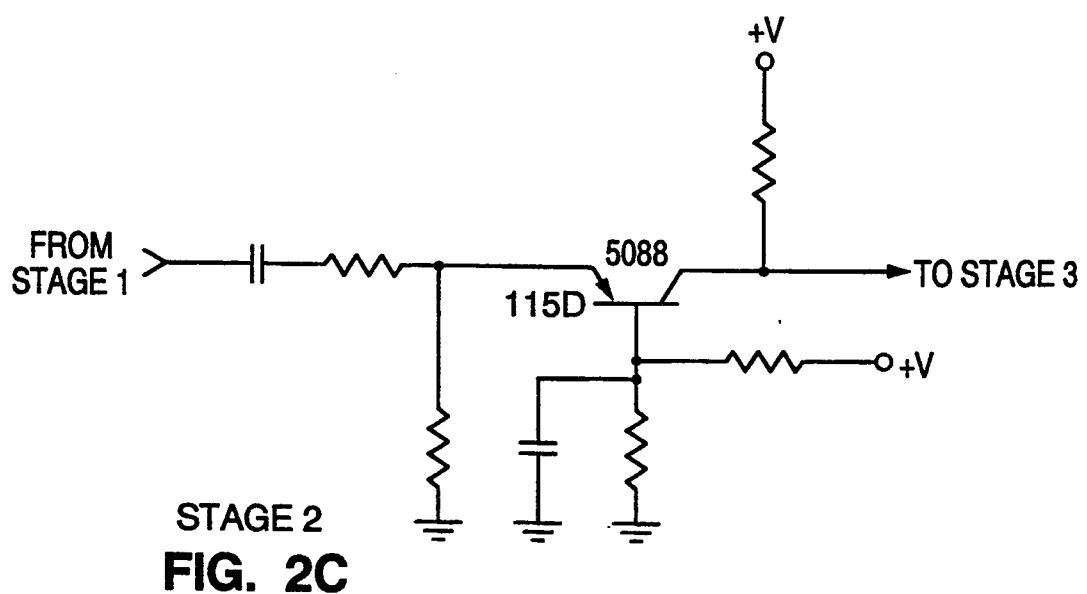

The second stage 114b is preferably realized with a common base configured amplifier 115d which provides an additional 20 dB of wideband gain, such as the Motorola MBT5088, connected as illustrated in FIG. 2c.

Figure 2D:
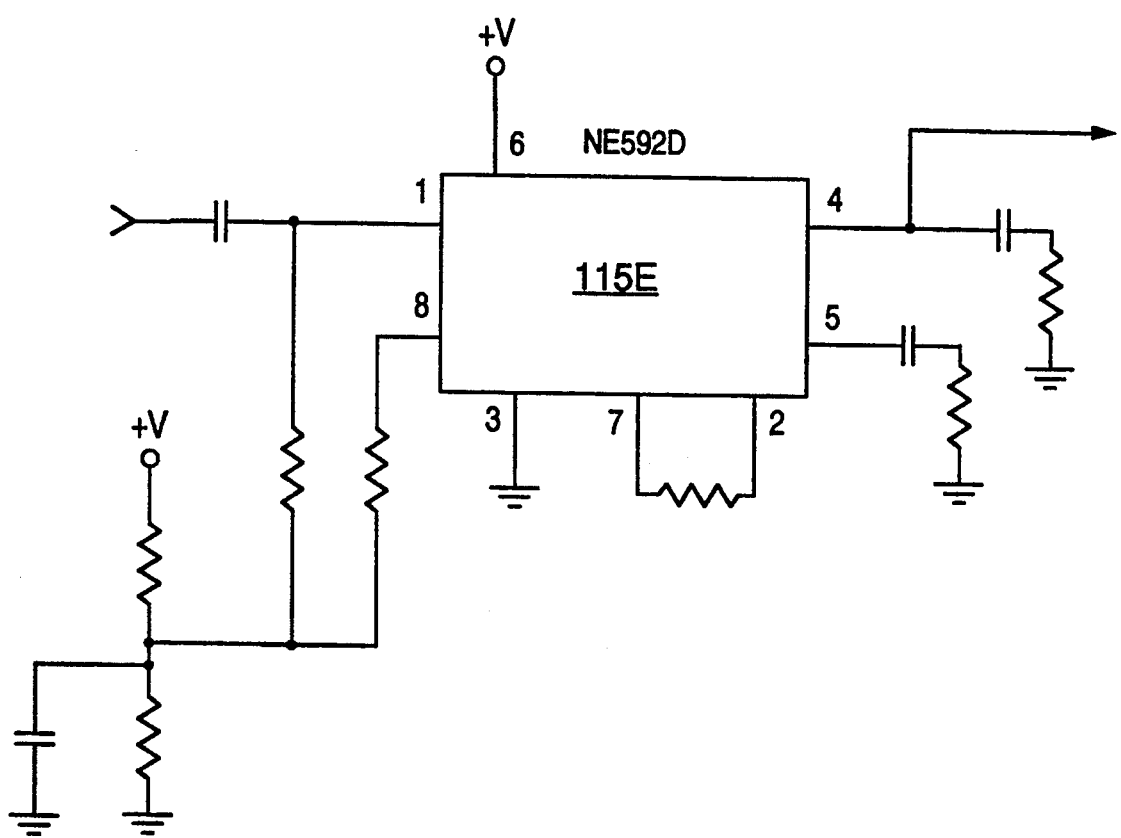

The third stage 114c is preferably constructed using a Signetics NE592D8 video amplifier 115e connected as shown in FIG. 2d in order to provide 40 dB of gain at 90 MHz bandwidth.

The amplifier 114 generates an output signal V1 that is processed and evaluated by decision network 116 to determine whether it represents a valid laser signal as previously defined. The signal V1 is directed along three paths in order to provide an envelope against which the signal peak will be evaluated. First, signal V1 is directed to one input of an amplifier 126, such as the Motorola LM358 operational amplifier, where a signal V3 is generated that represents the DC offset of the noise component of signal V1. Second, the signal V1 is directed to a peak detector portion 120 of the circuit, realized by an RC network, where the pulse width of signal V1 is increased or "stretched" into signal V2. Third, the signal V1 is applied to one input of a slow speed comparator 128, such as the Motorola LM339D which has a 200 nanosecond propagation delay.

Signal V2 is supplied to one input of a first comparator 122 and to the positive terminal input (+) of a differential operational amplifier 124. The first comparator 122 is medium speed comparator such as the Motorola LM311D having a 100 nanosecond propagation delay. The operational amplifier 124 is a Motorola LM358. The other inputs to comparators 122 and 128 are provided by the output of operational amplifier 124, i.e., voltage threshold Vth.

The operational amplifier 124 has a gain k which is greater than the noise envelope and determined by the constant false alarm rate (CFAR). A threshold detector that has additive Gaussian noise in the signal to be detected may generate a false alarm since the amplitude of the noise has a finite probability of being any value from 0 volts to infinite volts over time. The false alarm rate is determined solely by the difference between the threshold voltage and the RMS noise voltage. The equation that describes this relationship is:

$$T_{th} = \frac{1}{BW} \cdot e^{\left(\frac{V_T}{\sqrt{\sigma}}\right)^2}$$

Where $T_{th}$=average time between false alarms, where a false alarm is defined as any threshold crossing due to noise;
BW=Baseband bandwidth (about 30 MHz);
VT=threshold voltage required to achieve $T_{th}$;
$\sqrt{\sigma}$=RMS noise voltage.

It can be seen that if the ratio of VT to $\sqrt{\sigma}$ remains constant, then $T_{th}$ will also remain constant. Also, it should be noted that the "envelope" signal that is derived by the aforementioned circuitry is the RMS value of the noise voltage. Therefore, the threshold voltage Vth needs to be a linear function of the RMS noise voltage to maintain a constant false alarm rate, namely:

$$VT = k\sqrt{\sigma} + V_{DC}$$

where $V_{DC}$ is the average noise voltage and is actually the DC offset of the noise. Thus, the sensitivity of the receiver improves as the threshold voltage decreases. However, the false alarm rate increases as the threshold voltage decreases, so sensitivity and false alarm rate must be traded off to achieve best results.

Output A from comparator 122 and output B from comparator 128 are connected to a microprocessor 130 such as the 28 pin Motorola MC688C05P7 microprocessor with mask programmable ROM. The microprocessor 130 is programmed to evaluate the timing of logical true values on outputs A and B, to count the number of times that output A goes true consecutively if the timing constraints are met, to provide a statistical threat determination based on the count, and to provide user indications of these and other conditions, as will be described in more detail below.

The microprocessor 130 drives an ALERT LED 140 and sounds an ALERT horn 142 when at least two consecutive valid pulses have been received, the horn 142 requiring an output driver amplifier 143 to provide adequate signal strength to the horn. The microprocessor also drives a group of signal strength LED's 144 which may be arranged, for example, as a bar graph. The number of LED's 144 which are lit increases as signal strength increases such that all of the LED's 144 will be lit for a strong laser signal and only one of the LED's 144 will be lit for a weak laser signal, as will be described more fully later. A power indicator PILOT LED 146 provides a visual indication that the system is powered up.

Figure 3:
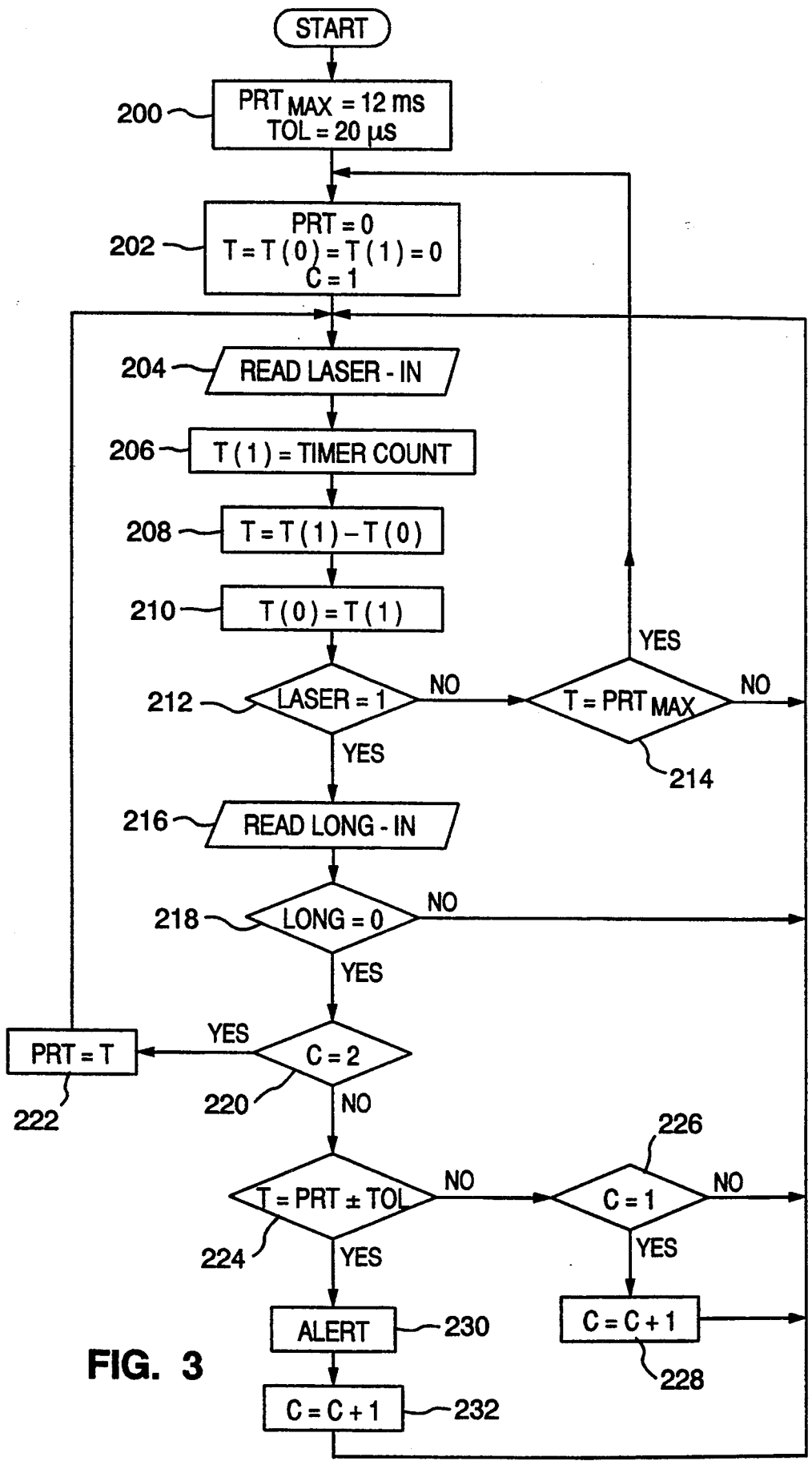
FIG. 3 is a flow chart illustrating decisional logic as utilized in the preferred embodiment of the present invention.

The logic routine that is implemented in microprocessor 130 is illustrated in the flow chart of FIG. 3. An assembly code listing of the preferred program to implement the logic in the Motorola MC688C05P7 microprocessor is attached hereto as Appendix A. The Motorola microprocessor has a feature called Timer Count which generates a value that represents a real time event count. This feature is utilized by the logic routine to provide a time reference for received pulses. In addition to the timer count TC, the program logic defines two constants and five variables as follows:

$PRT_{MAX}$=maximum pulse recurrence time;
TOL=jitter tolerance of the PRT;
PRT=recurrence time of the current pulse;
T(1)=timer count for current pulse;
T(0)=timer count for previous pulse;
T=T(1)–T(0);
C=pulse counter;

The initialization routine for the microprocessor 130 is shown in blocks 200 and 202. In block 200, the first constant $PRT_{MAX}$ is set to a preselected time that represents the maximum acceptable pulse recurrence time. Preferably, $PRT_{MAX}$ is set equal to 12 milliseconds. The second constant TOL is set equal to a preselected time that represents an acceptable jitter tolerance of the pulse recurrence time PRT. Preferably, TOL is set equal to 20 microseconds.

In block 202, the first variable PRT is set equal to 0, the second variable T(1) is set equal to 0, the third variable T(0) is set equal to 0, the fourth variable T is set equal to 0, and the fifth variable C is set equal to 0.

After initialization, the program looks for laser pulses. First, output A is read (block 204). Then, variable T(1) is set equal to the present value of real time counter TC (block 206). Next, variable T is set equal to T(1)–T(0) (block 208). Finally, variable T(0) is set equal to T(1) (block 210). If output A≠1 (block 212), then T is compared to $PRT_{MAX}$. If T≠$PRT_{MAX}$, then the program loops back to block 204 and keeps looking for pulses. If T=PRT$_{MAX}$, then the program loops to block 202 and the program variables are reset.

If output A=1, then output B is read (block 216). If output B≠0, then the program loops back to block 204 to keep looking for a valid pulse. If output B=0, then the pulse detected is not too long, and the counter C is examined to determine if the present pulse is the second pulse detected (block 220). If so, then variable PRT is set equal to T, i.e., the time difference between this and the previous pulse (block 222). If not, then T is compared to PRT±TOL (block 224). If T=PRT±TOL, then an ALERT signal is generated (block 230) and the counter C is incremented (block 232). If T≠PRT±TOL, then the counter C is examined. If C=1, the counter C is incremented and the program loops back to block 204. If C≠1, then the program loops directly back to block 204.

Determination of relative threat, i.e., the proximity and strength of a detected signal, can be made by counting the number of consecutive valid pulses received by the system, which number is stored in counter C according to the routine just described. The number C is used to reference a look-up table and a corresponding relative threat indication is retrieved from the table. The look-up table is constructed based on a Gaussian probability density function for signal strength. The probability function is determined based on empirical study of factors such as distance from the transmitter to the detector and the number of reflections the signal made before reaching the detector.

The look-up table relies on the fact that the detected signal is buried in additive Gaussian noise. In its simplest form, a weak signal "rides" on the noise. Thus, there is a minimum discernible signal level (MDS) for the laser signal which is equal to the threshold voltage. The noise may increase the signal amplitude causing it to exceed the threshold, or it may decrease the signal amplitude causing it to be less than the threshold. Statistically, there is a 50% probability p(x) that a weak signal (MDS) will exceed the threshold. The magnitude of MDS is dependent on the distance between the detector and the source (MDS $\propto 1/r^2$) and on the number of objects in the path of the light source that cause the light beam to scatter. Since the beam also spreads out naturally in a Gaussian fashion the angle it forms with the detector determines the amount of light which reaches the detector. Analysis of these factors led to the implementation of the look-up table as a straight line function dependent on the number of valid pulses received. For example, if the probability p(5) of receiving five pulses in a row is x, then the probability p(10) of receiving ten pulses in a row is x/2, p(25) is x/5, and so on. Therefore, the lookup table increases the rate at which the ALERT horn 142 is sounded in increments of 5 consecutive pulses and increases the number of LED's 144 which are illuminated every 10 consecutive pulses, as illustrated in Table I.

TABLE I

| Count | Beep Rate | Number of LED's |
|-------|-----------|-----------------|
| 3-5   | 2 Hz      | 1               |
| 6-10  | 4 Hz      | 1               |
| 11-15 | 6 Hz      | 2               |
| 16-20 | 8 Hz      | 2               |
| 21-25 | 10 Hz     | 3               |
| 25-30 | SOLID     | 3               |

Figure 4:
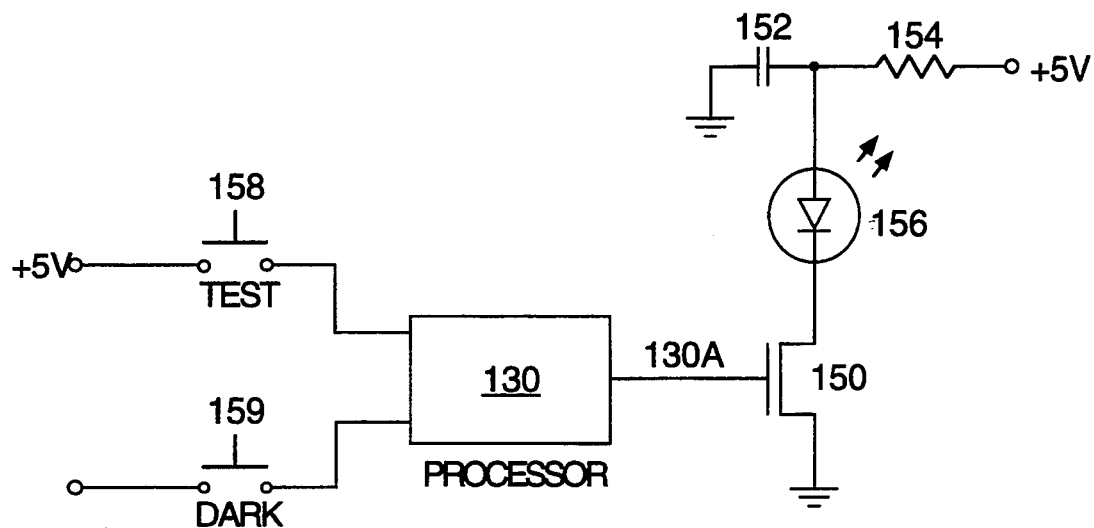
FIG. 4 is a schematic diagram of additional features of the preferred embodiment of the present invention.

Advantageously, a test feature can be provided as illustrated in FIG. 4 to ensure that the detector is working properly. The test feature is a Q-switch modulator realized by a MOSFET transistor 150 having its source connected to ground, its drain connected in combination with a 0.01 microfarad capacitor 152 and a 100 kilohm resistor 154 to an LED 156. The MOSFET gate is driven by an input 130a from the microprocessor 130. The LED 156 must be positioned in the field of view of photodiode 110 (refer to FIG. 2).

The input 130a is a pulse train that simulates a valid laser pulse. When test switch 158 is closed, the microprocessor 130 generates a train of 4 pulses on input 130a having a pulse width of 2 microseconds and a period of 8 milliseconds. The Q of capacitor 152 and the "on" resistance of LED 156 sets the output light pulse width to approximately 1 microsecond. The laser detection scheme operates as described above with reference to FIGS. 2 and 3. If the number of valid pulses received equals the number of valid pulses sent by the test circuit, then it is confirmed that the laser detection circuitry is working properly.

Alternatively, the test feature could be run as part of a start-up routine when power is applied to the device.

Advantageously, a DARK switch 159 could also be provided to disable all LED's except the PILOT LED 146 so that the use of the laser detection apparatus of the present invention could not be readily ascertained by someone outside the user's vehicle.

Figure 5:
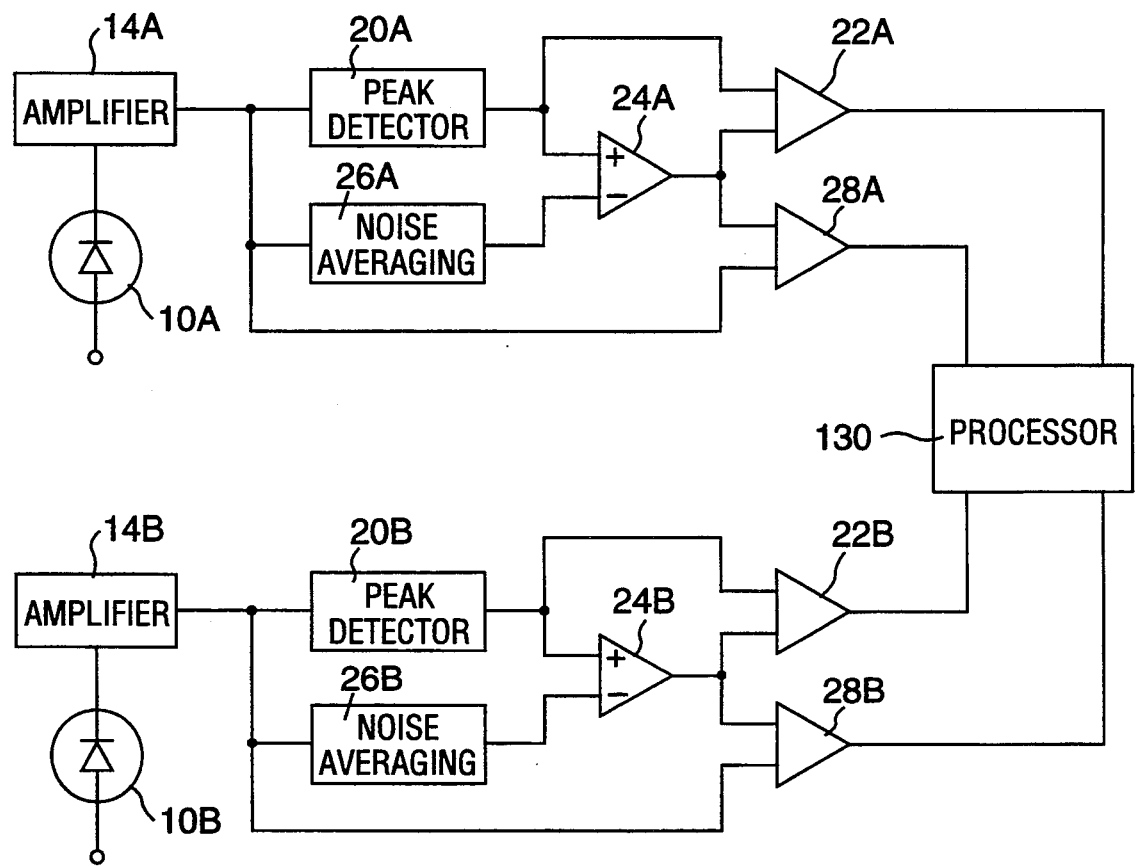
FIG. 5 is a block diagram of an alternative embodiment of a laser detector according to the present invention.

In an alternative embodiment, illustrated in FIG. 5, two laser detection circuits can be connected to a single microprocessor 130. The top portion 160 of FIG. 5 is identical to the system illustrated in FIG. 1 and shares the same numbering scheme except for the addition of the letter "a" after each reference numeral. Likewise, the bottom portion 162 of FIG. 5 is identical to the system illustrated in FIG. 1 and shares the same numbering scheme except for the addition of the letter "b" after each reference numeral. Advantageously, top portion 160 may be utilized for forward detection by positioning the top portion to scan out the front of a vehicle, and the bottom portion 162 may be utilized for rearward detection by positioning the bottom portion to scan out the rear of a vehicle. The microprocessor 130 typically operates on the forward detecting top portion 160, for example, but reception of a valid laser pulse on the rearward facing bottom portion 162 causes an interrupts. In the microprocessor 130 so that the bottom portion 162 is operated on.

It should be understood that the invention is not limited by the specifics described above, but is defined by the accompanying claims.

We claim:

1. A method for determining the strength and proximity of a pulsed-laser radar signal which has been detected by a radar detection apparatus, said radar detection apparatus comprising a photodetector, a decision network coupled to the photodetector, a processor coupled to the decision network, and a threat indicator coupled to the processor, the method comprising:

evaluating the detected signal with the decision network, said decision network generating an output pulse when the detected signal is a valid signal according to predefined criteria implemented in the decision network;

counting output pulses which occur for consecutive detected signals with the processor;

providing a look-up table in the processor having predetermined values therein;

looking up the count in the look-up table and generating a value which corresponds to the count; and driving the output level of the threat indicator in proportion to the generated value.

2. The method of claim 1, wherein the evaluating step comprises:

comparing the magnitude of the detected signal to a reference magnitude and generating a first logic output which is true if the magnitude of the detected signal exceeds the reference magnitude and which is false otherwise;

comparing the pulse width of the detected signal to a reference pulse width and generating a second logic output which is false if the pulse width of the detected signal exceeds the reference pulse width and which is true otherwise; and generating the output pulse when the first logic output is true and the second logic output is false.

3. A pulsed-laser radar detection apparatus, comprising:

a photodetector;

a decision network coupled to the photodetector, said decision network generating an output pulse when a signal detected by the photodetector is a valid signal according to predefined criteria which are implemented in the decision network;

processing means coupled to the decision network, said processing means including means for counting output pulses which occur for consecutive detected signals, a look-up table having predetermined values therein, and means for looking up the count in the look-up table and generating a value which corresponds to the count; and a relative threat indicator coupled to the processing means, wherein the indicator generates an indication having a characteristic which is proportional to the generated value.

4. The apparatus of claim 3, wherein the indication is visual.

5. The apparatus of claim 4, wherein the characteristic is volume.

6. The apparatus of claim 4, wherein the characteristic is frequency.

7. The apparatus of claim 3, wherein the indication is audible.

8. The apparatus of claim 3, wherein said predetermined values are determined by a Gaussian probability density function for signal strength.

9. The apparatus of claim 3, wherein the decision network comprises:

means for comparing the magnitude of the detected signal to a reference magnitude and generating a first logic output which is true if the magnitude of the detected signal exceeds the reference magnitude and which is false otherwise;

means for comparing the pulse width of the detected signal to a reference pulse width and generating a second logic output which is false if the pulse width of the detected signal exceeds the reference pulse width and which is true otherwise; and means for generating the output pulse when the first logic output is true and the second logic output is false.

10. An apparatus for detecting a valid pulsed-laser radar signal and for providing an indication of the relative strength and proximity of the detected signal, comprising:

a photodetector for detecting an optical signal and for converting it to an electrical signal;

a first amplifier coupled to the photodetector for boosting the electrical signal thereby creating a first signal V1;

an RC network coupled to the first amplifier for stretching the pulse width of the first signal V1 thereby creating a second signal V2;

a second amplifier coupled to the first amplifier for extracting a DC offset from the first signal V1 thereby creating a third signal V3;

a differential amplifier having a positive input coupled to the second signal V2 from the RC network, a negative input coupled to the third signal V3 from the second amplifier, and a threshold output;

a first comparator having a first input coupled to the threshold output, a second input coupled to the second signal V2 from the RC network, and a first logic output A;

a second comparator having a first input coupled to the threshold output, a second input coupled to the first signal V1 from the first amplifier, and a second logic output B;

a microprocessor coupled to the first logic output A from the first comparator and to the second logic output B from the second comparator, said microprocessor being programmed to evaluate the timing of logical values on outputs A and B, wherein the microprocessor further comprises means to count consecutive valid pulsed-laser signals, means to store the count, and means to provide a statistical correlation to signal strength and signal proximity based on the count; and an alert indicator coupled to the microprocessor and having means for providing an alert indication that can vary in degree between a low level and a high level, wherein if output A is true and output B is false then a valid pulsed-laser signal is detected and the alert indicator is driven at a low level, and wherein the alert indicator is driven at a level that is determined by the statistical correlation of the count.

* * * * *